(12) United States Patent
Zhang et al.

(10) Patent No.: US 11,893,103 B2
(45) Date of Patent: *Feb. 6, 2024

(54) OFFLINE PROCESSING USING ON-DEMAND ACCESS TOKENS

(71) Applicant: Intuit Inc., Mountain View, CA (US)

(72) Inventors: Yi Zhang, San Diego, CA (US); Thomas John Holodnik, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,665

(22) Filed: Jun. 21, 2022

(65) Prior Publication Data

US 2022/0318364 A1   Oct. 6, 2022

Related U.S. Application Data

(63) Continuation of application No. 16/528,574, filed on Jul. 31, 2019, now Pat. No. 11,423,135.

(51) Int. Cl.
*G06F 21/41* (2013.01)
*G06F 21/33* (2013.01)
*G06F 9/54* (2006.01)
*H04L 9/32* (2006.01)
*G06F 9/46* (2006.01)
*G06F 21/31* (2013.01)

(52) U.S. Cl.
CPC ............. *G06F 21/41* (2013.01); *G06F 9/466* (2013.01); *G06F 9/541* (2013.01); *G06F 21/316* (2013.01); *G06F 21/335* (2013.01); *H04L 9/3213* (2013.01)

(58) Field of Classification Search
None
See application file for complete search history.

(56) References Cited

U.S. PATENT DOCUMENTS

| | | |
|---|---|---|
| 2010/0299734 A1 | 11/2010 | Lynch et al. |
| 2015/0121462 A1 | 4/2015 | Courage et al. |
| 2015/0149343 A1 | 5/2015 | Schwartz |
| 2017/0214683 A1 | 7/2017 | Kroehling et al. |
| 2017/0223005 A1 | 8/2017 | Birgisson et al. |
| 2017/0302655 A1 | 10/2017 | Sondhi et al. |
| 2018/0302390 A1 | 10/2018 | Beecham |
| 2019/0068588 A1* | 2/2019 | Inabe .................... H04L 63/108 |
| 2019/0139029 A1 | 5/2019 | Kadiwala et al. |
| 2019/0372993 A1 | 12/2019 | Dunjic et al. |

OTHER PUBLICATIONS

Hardt, D., "The OAuth 2.0 Authorization Framework"; Internet Engineering Task Force (IETF) memo published Oct. 2012 (76 pages). <https://tools.ietf.org/html/rfc6749>.

* cited by examiner

*Primary Examiner* — Charles E Anya
(74) *Attorney, Agent, or Firm* — FERGUSON BRASWELL FRASER KUBASTA PC

(57) ABSTRACT

A method may include registering, with an offline job to be executed by a computer processor, an application programming interface (API) and an operation, obtaining, from a repository, a user consent of a user for the operation, and in response to obtaining the user consent, creating, for the user, an access token including the operation and the API. The user consent may be stored external to the access token. The method may further include transmitting the access token to the offline job, and calling, by the offline job, the API using the access token.

18 Claims, 6 Drawing Sheets

OFFLINE PROCESSING USING ON-DEMAND ACCESS TOKENS

CROSS REFERENCE TO RELATED APPLICATIONS

This application is a continuation of U.S. application Ser. No. 16/528,574 filed Jul. 31, 2019, which is herein incorporated by reference.

BACKGROUND

Offline processing refers to hosted services and applications that run in the background without user intervention. During offline processing, although there is no actively logged on user, services and applications may need to perform security sensitive operations on behalf of users. For example, General Data Protection Regulation (GDPR) requirements may specify that user data be deleted or obfuscated, possibly across multiple services and applications. Another example of a security sensitive operation is acquiring financial transactions on behalf of a user. Health Insurance Portability and Accountability Act (HIPAA) requirements for patient data records are yet another example. Conventional approaches to supporting security sensitive operations are often based on the industry standard OAuth2 protocol, which may result in a significant processing overhead for background jobs, especially when the number of users is large.

OAuth2 provides clients with "secure delegated access" to server resources on behalf of a resource owner. OAuth2 specifies a process for resource owners to authorize third-party access to their server resources using access tokens without sharing their credentials. OAuth2 essentially allows access tokens to be issued to third-pal clients by an authorization server, with the approval of the resource owner. The third party may then use the access token to access the protected resources hosted by the resource server.

In OAuth2, long-lived user consent is represented in a long-lived security token, called a refresh token. Clients are required to securely store and manage the refresh tokens, which may result in significant processing overhead. The OAuth2 threat model and security recommendations also require that refresh tokens be frequently rotated and that old refresh tokens be invalidated after rotation, which makes concurrent processing (e.g., multiple threads or multiple instances of the same background job) challenging due to race conditions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including registering, with an offline job to be executed by a computer processor, an application programming interface (API) and an operation, obtaining, from a repository, a user consent of a user for the operation, and in response to obtaining the user consent, creating, for the user, an access token including the operation and the API. The user consent is stored external to the access token. The method further includes transmitting the access token to the offline job, and calling, by the offline job, the API using the access token.

In general, in one aspect, one or more embodiments relate to a system including a memory coupled to a computer processor, and a repository configured to store a user consent of a user for an operation, an application programming interface (API), and an access token for the user including the operation and the API. The system further includes an offline job, executing on the computer processor and using the memory, configured to call the API using the access token, and a runtime manager, executing on the computer processor and using the memory, configured to register, with the offline job, the API and the operation, obtain the user consent from the repository, and in response to obtaining the user consent, create, for the user, the access token. The user consent is stored external to the access token. The runtime manager is further configured to transmit the access token to the offline job.

In general, in one aspect, one or more embodiments relate to a method including creating, by a financial management application (FMA) executing on a computer processor, an offline job to acquire transactions, registering, with the offline job, an application programming interface (API) and an operation to acquire transactions, obtaining, from a repository, a user consent of a user for the operation, in response to obtaining the user consent, creating, for the user, an access token including the operation and the API. The user consent is stored external to the access token. The method further includes transmitting the access token to the offline job, and acquiring, by the offline job, transactions of the user from a financial institution by calling the API using the access token.

Other aspects of the invention will be apparent from the following description and the appended claims.

DETAILED DESCRIPTION

Figure 1:
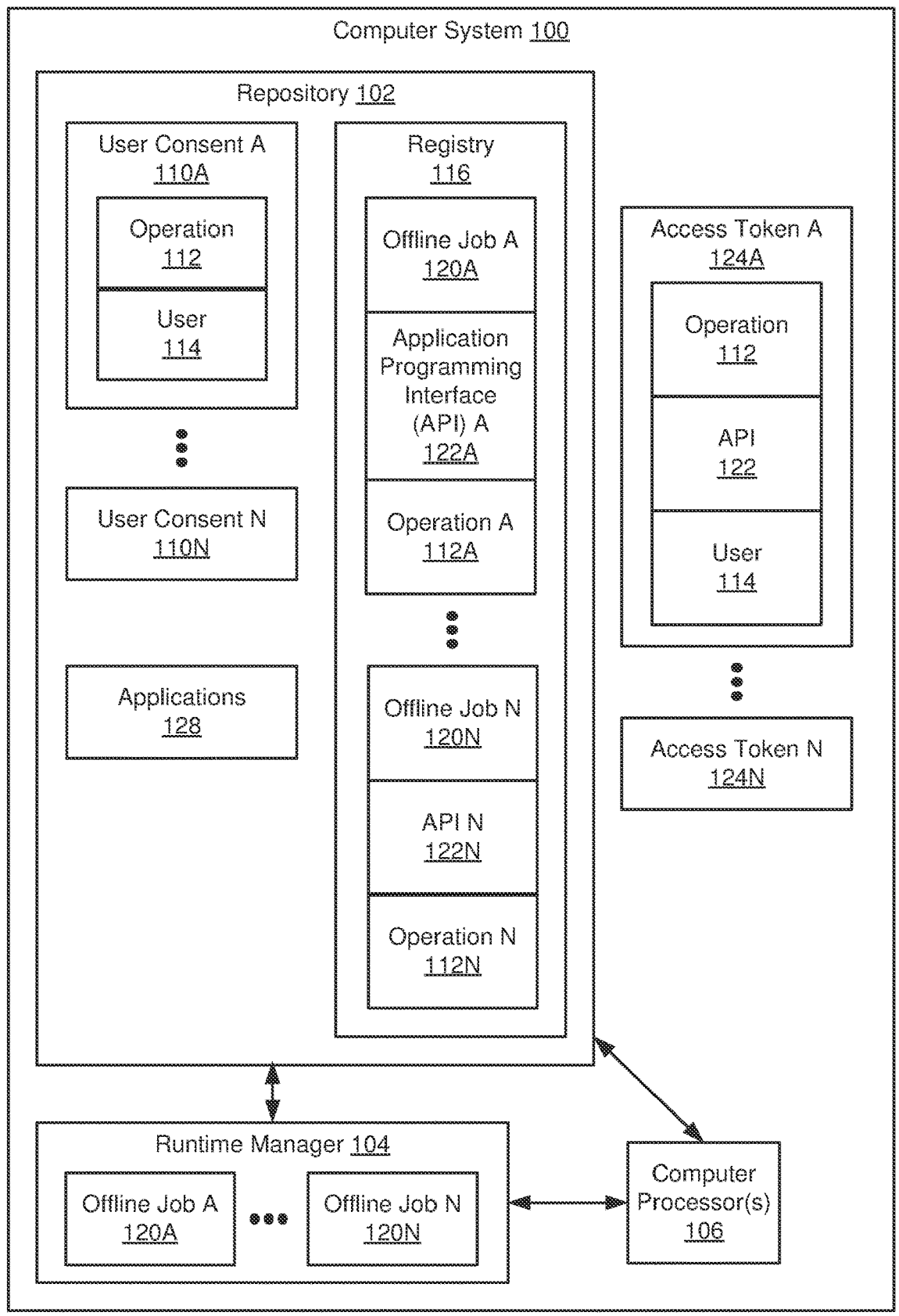
FIG. 1 shows a flow diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to offline processing using access tokens. In one or more embodiments, an application programming interface (API) and an operation are registered with an offline job. The operation may be a task performed on a security sensitive resource, such as transactions of a user at a financial institution (e.g., a bank or credit card company). A user consent to perform the operation on behalf of the user may be obtained from a repository. The user consent may be derived from an action detected while the user is using an application. Thus, deriving the user consent from the action may simplify the processing of user consents. For example, an action that adds a connection to a financial institution while the user is using a financial management application (FMA) may be interpreted as consent to perform operation to acquire the user's transactions on a recurring basis from the financial institution. When the offline job is activated (e.g., in response to an alert indicating that new transactions of the user are available for download), the offline job may request and obtain an access token that includes an identifier of the operation, an identifier of the API, and an identifier of the user. The access token may be created in response to verifying that user consent has been recorded for the operation, and that the offline job has been properly registered with the operation and the API.

The offline job may acquire, using the access token, the transactions of the user from the financial institution using the API. Continuing this example, once the transactions have been acquired by the offline job and transmitted to an application (e.g., the FMA), the application may analyze the transactions to perform a cash flow analysis to determine whether the user will require or qualify for a loan.

Storing the user consent in a central repository, instead of storing the user consent in the access token, has the advantage of separating the management of long-lived user consent from the management of short-lived access tokens. By including, in the access token, the identifier of the API in addition to the identifier of the operation, the scope of the operation within the access token may be restricted to the specific API registered with the operation. Restricting the scope of the operation within the access token to a specific API may improve security, since unauthorized use of the access token will only compromise the operation when performed in the context of the specific API. In addition, the offline job may be freed from the burden of managing access tokens and user consents. That is, the offline job may simply request and receive, on demand, access tokens without needing to manage access tokens or verify whether user consent has been granted for the operation included in the access token. In one or more embodiments, the access token is immutable, and does not require any sort of modification (e.g., no refreshing or rotation is required). For example, an access token may be shared among offline jobs without any requirement for synchronizing access to the access token by the offline jobs. Decoupling the management of user consents from the creation of access tokens (e.g., by storing user consents in a database external to, and independent of any access token) drastically reduces the complexity of offline jobs, and is a key enabler of scalability, for example, when the number of offline jobs is very large or when the amount of offline processing is large. For example, an offline job may support large numbers (e.g., millions) of users.

FIG. 1 shows a computer system (100) in accordance with one or more embodiments of the invention. As shown in FIG. 1, the computer system (100) includes a repository (102), a runtime manager (104), one or more computer processors (106), and access tokens (124A, 124N). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes user consents (110A, 110N), a registry (116), and applications (128). In one or more embodiments, a user consent (110A) includes an operation (112) and a user (114). In one or more embodiments, the operation (112) is a task performed on a security sensitive resource. For example, the security sensitive resource may be transactions of the user (114) and the operation (112) may be "acquire transactions". Continuing this example, the transactions may be transactions of a financial institution (e.g., a bank, credit card company, brokerage company, etc.), invoices, medical records and/or any record of an event that a user (114) may consider to be security sensitive. As an alternative example, the security sensitive resource may be personal data of the user (114) and the operation (112) may be "obfuscate personal data" (e.g., to satisfy General Data Protection Regulation (GDPR) requirements). The operation (112) may be identified by a name or identifier associated with the operation. In one or more embodiments, the user (114) is an individual. Alternatively, the user (114) may be a business entity.

In one or more embodiments, the user consent (110A) is valid until revoked by the user (114). Alternatively, the user consent (110A) may be valid until a pre-determined expiration period elapses. For example, the pre-determined expiration period may be based on legal requirements. User consents (110A, 110N) may be long-lived in the sense that the user consents (110A, 110N) may be infrequently modified (e.g., revoked or expired). In one or more embodiments, user consents (110A, 110N) are stored external to access tokens (124A, 124N).

In one or more embodiments, the registry (116) includes offline jobs (120A, 120N), application programming interfaces (APIs) (122A, 122N), and operations (112A, 112N). That is, entries in the registry (116) may associate an API (122A) and an operation (112A) with an offline job (120A). An offline job (120A) may be a process that performs one or more operations (112A, 112N) for a user (114) in the background when the user (114) is not logged in to an application (128). For example, an operation (112A) may acquire transactions of the user (114) from a financial institution (e.g., as the transactions become available) via an API (122A). Alternatively, the operation (112A) may be a General Data Protection Regulation (GDPR) operation that obfuscates data of the user (114) used in an application (128). The operation (112A) may be performed using one or more access tokens (124A, 124N).

In one or more embodiments, the offline job (120A) is created by an application (128). For example, a financial management application (FMA) may create the offline job to acquire transactions from financial institutions. Alternatively, the offline job (120A) may be created by the runtime manager (104). For example, the offline job (120A) may be created by the runtime manager (104) in response to a request to create the offline job (120A) received from an application (128). The offline job (120A) may be identified by a name or identifier (e.g., a job number) associated with the offline job (120A).

In one or more embodiments, the API (122A) includes a defined set of methods of communication between software components (e.g., between applications (128)). The API (122A) may include function or subroutine names, communication protocols to use for the communication, the format for values transmitted in the communication, etc. that the API (122A) requires in order to process various communications. The API (122A) may further define input and/or output parameters for the communication. The API (122A) may be identified by a name or identifier associated with the API (122A).

In one or more embodiments, the applications (128) are any software applications used by multiple users (e.g., over a network). An application (128) may include functionality to store, process and/or analyze various types of transactions. An application (128) may include functionality to create one or more offline jobs (120A, 120N). An application (128) may be a financial management application (FMAs) that stores information about financial transactions of users and enables users to manage their financial activities.

An application (128) may be a collection of source code including various software components. The application (128) may include statements written in a programming language, or intermediate representation (e.g., byte code). The application (128) may be transformed by a compiler into binary machine code. Compiled machine code may be executed by the processor (106) in order to execute software components generated from the application (128). In one or more embodiments, the application (128) may be any collection of object code (e.g., machine code generated by a compiler) or another form of the application (128).

In one or more embodiments, an access token (124A) includes an operation (112), an application programming interface (API) (122), and a user (114). The access token (124A) may be used to perform the operation (112) on behalf of the user (114) via the API (122). In one or more embodiments, an access token (124A) is immutable. In other words, in one or more embodiments, the access token (124A) does not require refreshing, rotation, or any sort of modification. The access token (124A) may typically have a short life span (e.g., an hour, a day, etc.) after which the access token (124A) expires. The life span may be set by one or more rules of a policy.

In one or more embodiments, the runtime manager (104) may be implemented in hardware (e.g., circuitry), software, firmware, and/or any combination thereof. In one or more embodiments, the runtime manager (104) includes functionality to create and/or manage offline jobs (120A, 120N). The runtime manager (104) may distribute the execution of the offline jobs (120A, 120N) among one or more processes executing in one or more computing devices of the computer system (100).

The runtime manager (104) may include functionality to create access tokens (124A, 124N). The runtime manager (104) may include functionality to receive requests for access tokens (124A, 124N) from offline jobs (120A, 120N). The runtime manager (104) may include functionality to transmit access tokens (124A, 124N) to offline jobs (120A, 120N). The runtime manager (104) may include functionality to obtain user consents (110A, 110N) from the repository (102). In one or more embodiments, the runtime manager (104) includes functionality to register, in the registry (116), an API (122A) and an operation (112A) with an offline job (120A).

In one or more embodiments, the computer processor (106) includes functionality to execute the runtime manager (104) and/or the applications (128).

While FIG. 1 shows a configuration of components, other configurations may be used without departing from the scope of the invention. For example, various components may be combined to create a single component. As another example, the functionality performed by a single component may be performed by two or more components.

Figure 2:
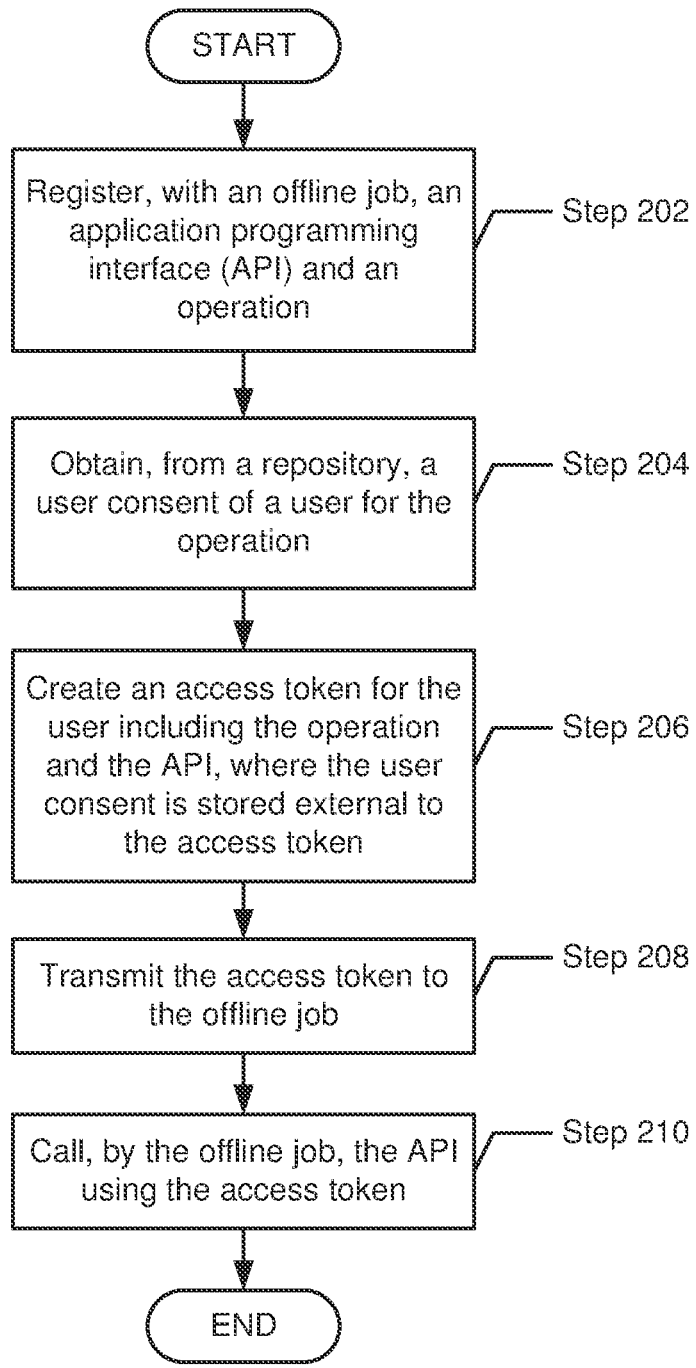
FIG. 2 and FIG. 3 show flowcharts of methods in accordance with one or more embodiments of the invention.

FIG. 2 shows a flowchart in accordance with one or more embodiments of the invention. The flowchart depicts a process for managing offline jobs. One or more of the steps in FIG. 2 may be performed by the components (e.g., the runtime manager (104) the offline jobs (120A, 120N) of the computer system (100)), discussed above in reference to FIG. 1. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, an application programming interface (API) and an operation are registered with an offline job. In one or more embodiments, the runtime manager registers the API and the operation with the offline job by adding, to a registry, an entry including an identifier of the offline job, an identifier of the API, and an identifier of the operation. Alternatively, in one or more embodiments, the operation is registered with the offline job without restricting the scope of the operation to a specific API. In one or more embodiments, an application creates the offline job. For example, a financial management application (FMA) may create the offline job to acquire transactions from financial institutions.

In Step 204, a user consent of a user for the operation is obtained from the repository. That is, in one or more embodiments, independently of creating an access token (in Step 206 below) that enables the operation to be performed on behalf of the user, the runtime manager verifies that the user has given consent to perform the operation on the user's behalf. The runtime manager may verify that the repository includes a user consent record that includes an identifier of the user and an identifier of the operation. In one or more embodiments, the runtime manager may cache the obtained user consent for the operation to streamline the process of obtaining the user consent for the operation in subsequent instances of Step 204. Step 306 and Step 308 below describe additional details for obtaining the user consent.

In Step 206, an access token including the operation and the API is created for the user in response to obtaining the user consent. Thus, the access token may restrict the scope of the operation to the API. Restricting the scope of the operation to a specific API may improve security, since the access token may only be used to perform the operation when using the API. Furthermore, in one or more embodiments, the runtime manager binds the access token to the offline job. Binding the access token to the offline job may prevent a malicious (e.g., unauthorized) actor from performing the operation unless the malicious actor both obtains the access token and impersonates the offline job.

The management of access tokens may be independent of the management of user consents due to storing the user consent for the operation (e.g., in the repository) external to the access token. In other words, the existence (e.g., creation) of the access token may be considered evidence that the user consent for the operation has been obtained.

In Step 208, the access token is transmitted to the offline job. For example, the runtime manager may transmit the access token to the offline job over a network. The runtime manager may share (e.g., transmit) the access token to multiple offline jobs. For example, the multiple offline jobs may execute in separate threads or separate processes of the computer system. The multiple offline jobs may be decoupled in the sense that the multiple offline jobs may execute concurrently without any requirement for synchronization. For example, since the access token is immutable, there is no need to synchronize any modifications to the access token. In one or more embodiments, the runtime manager tracks the access tokens created for each offline job.

In Step 210, the offline job calls the API using the access token. For example, the offline job may use the API in the access token to acquire transactions of the user from a financial institution. Continuing this example, once the transactions have been acquired by the offline job and transmitted to an application (e.g., a financial management application (FMA)), the application may analyze the transactions. Further continuing this example, the analysis may be a cash flow analysis to determine whether the user will require or qualify for a loan. Multiple offline jobs may call the API using the access token. For example, if the operation authorizes acquisition of a user's transactions, the multiple offline jobs may acquire transactions of the user from different transaction sources.

Figure 3:
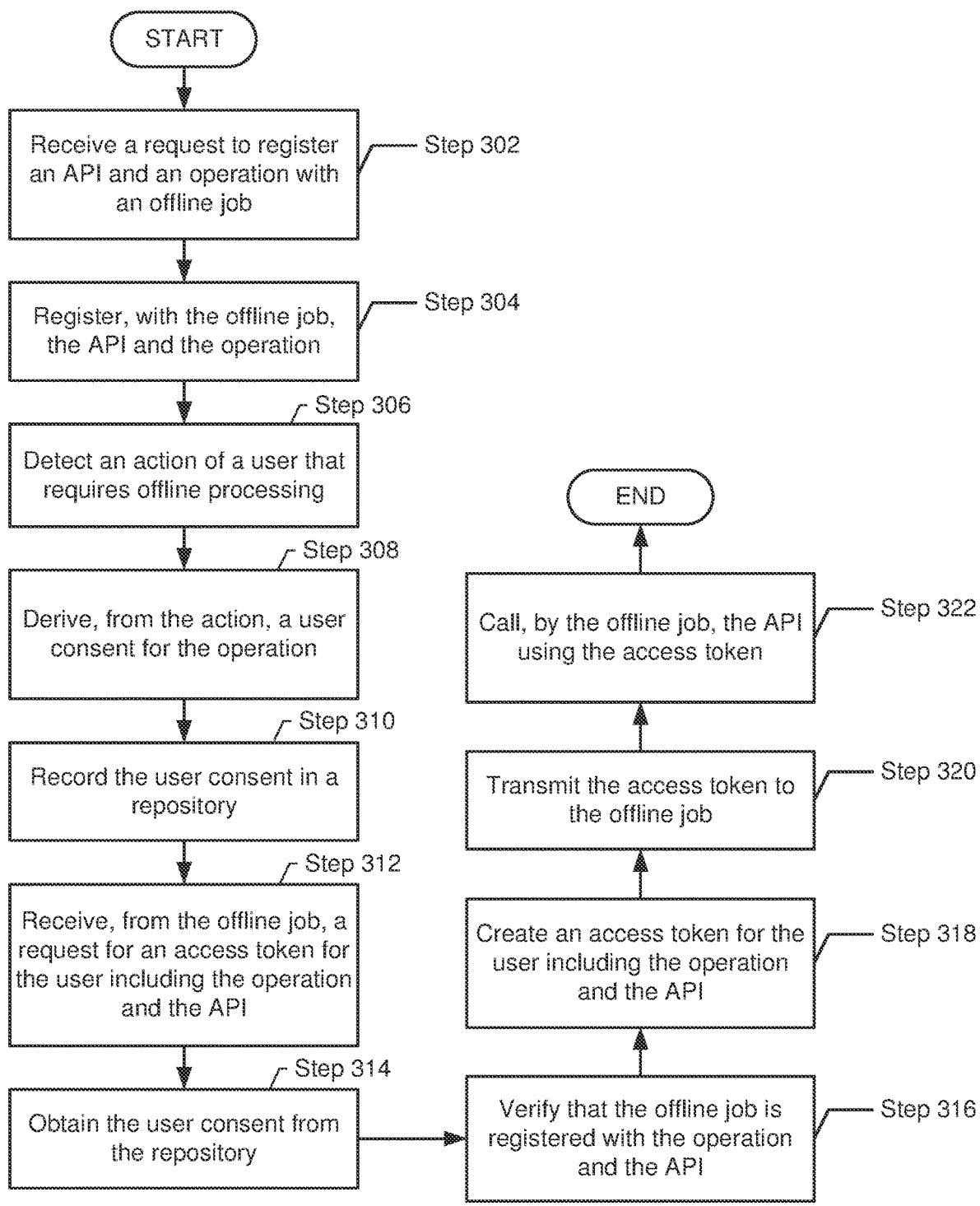

FIG. 3 shows a flowchart in accordance with one or more embodiments of the invention. The flowchart depicts a process for managing offline jobs. One or more of the steps in FIG. 3 may be performed by the components (e.g., the runtime manager (104), the offline jobs (120A, 120N), and the applications (128) of the computer system (100)), discussed above in reference to FIG. 1. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 302, a request to register an API and an operation with an offline job is received. For example, the request may be received by the runtime manager from the offline job. Alternatively, the request may be received by the runtime manager from an application or service that created the offline job.

In Step 304, the API and the operation are registered with the offline job (see description of Step 202 above). The runtime manager may register the API and the operation with the offline job in response to receiving the request in Step 302 above.

In Step 306, an action that requires offline processing is detected while the user is using an application. For example, the action may add a connection to a system external to the computer system. Continuing this example, the action may add a connection to a financial institution (e.g., a bank or credit card company) while the user is using a financial management application (FMA). As another example, the action may be accepting a user licensing agreement (ULA) for the application. In one or more embodiments, the application detects the action. The application may send an alert to the runtime manager regarding the detection of the action.

In Step 308, the user consent is derived from the action. In one or more embodiments, the action is interpreted as the user consent for the operation. The action may be interpreted as the user consent according to one or more rules for deriving the user consent. For example, the user consent for operation to acquire the user's transactions from a financial institution may be derived from an action that adds a connection to the financial institution while the user is using a FMA. Alternatively, the user consent may be derived from an action that enables a specific feature of the application. In one or more embodiments, the application derives the user consent. Thus, deriving the user consent from the action may simplify the processing of user consents. For example, there is no need for an explicit interaction and/or interface with the user to obtain user consent for the operation. The application may send an alert to the runtime manager regarding the derivation of the action. Alternatively, the runtime manager may derive the user consent (e.g., in response to an alert regarding the detection of the action received from the application).

In Step 310, the user consent is recorded in the repository. In one or more embodiments, the application records the user consent. Alternatively, the runtime manager may record the user consent (e.g., in response to an alert regarding derivation of the user consent received from the application).

In Step 312, a request is received, from the offline job, for an access token for the user that includes the operation and the API. The runtime manager may receive the request for the access token from the offline job when the offline job is activated (e.g., when the offline job is executed by the runtime manager). For example, the offline job may be activated in response to a triggering event, such as an alert from a financial institution regarding the availability of new transactions of the user.

In Step 314, the user consent is obtained from the repository (see description of Step 204 above).

In Step 316, the registration of the operation and the API with the offline job is verified. In one or more embodiments, the runtime manager verifies the registration of the operation and the API with the offline job by verifying that the registry includes an entry that includes an identifier of the offline job, an identifier of the API, and an identifier of the operation.

In Step 318, an access token including the operation and the API is created (see description of Step 206 above).

In Step 320, the access token is transmitted to the offline job (see description of Step 208 above).

In Step 322, the offline job calls the API using the access token (see description of Step 210 above).

The runtime manager may manage the creation of access tokens, obtain the user consent for the operation, and verify that the registration of offline job with the API and the operation has occurred. Thus, the offline job may be freed from the burden of managing access tokens and user consents. That is, the offline job may simply request and receive access tokens without needing to manage access tokens or verifying whether user consent has been obtained for the operation included in the access token.

Figure 4A:
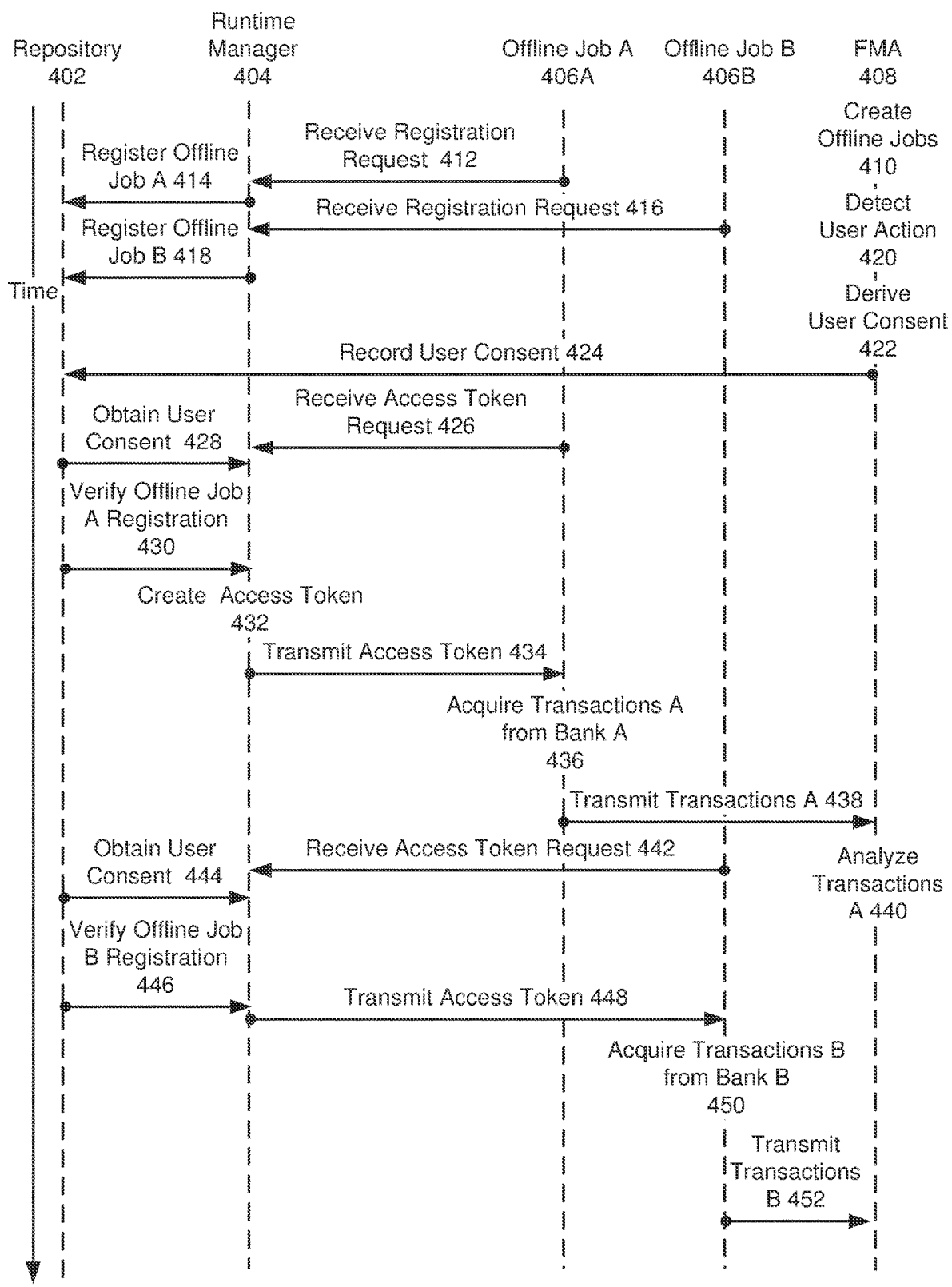
FIG. 4A and FIG. 4B show examples in accordance with one or more embodiments of the invention.
Figure 4B:
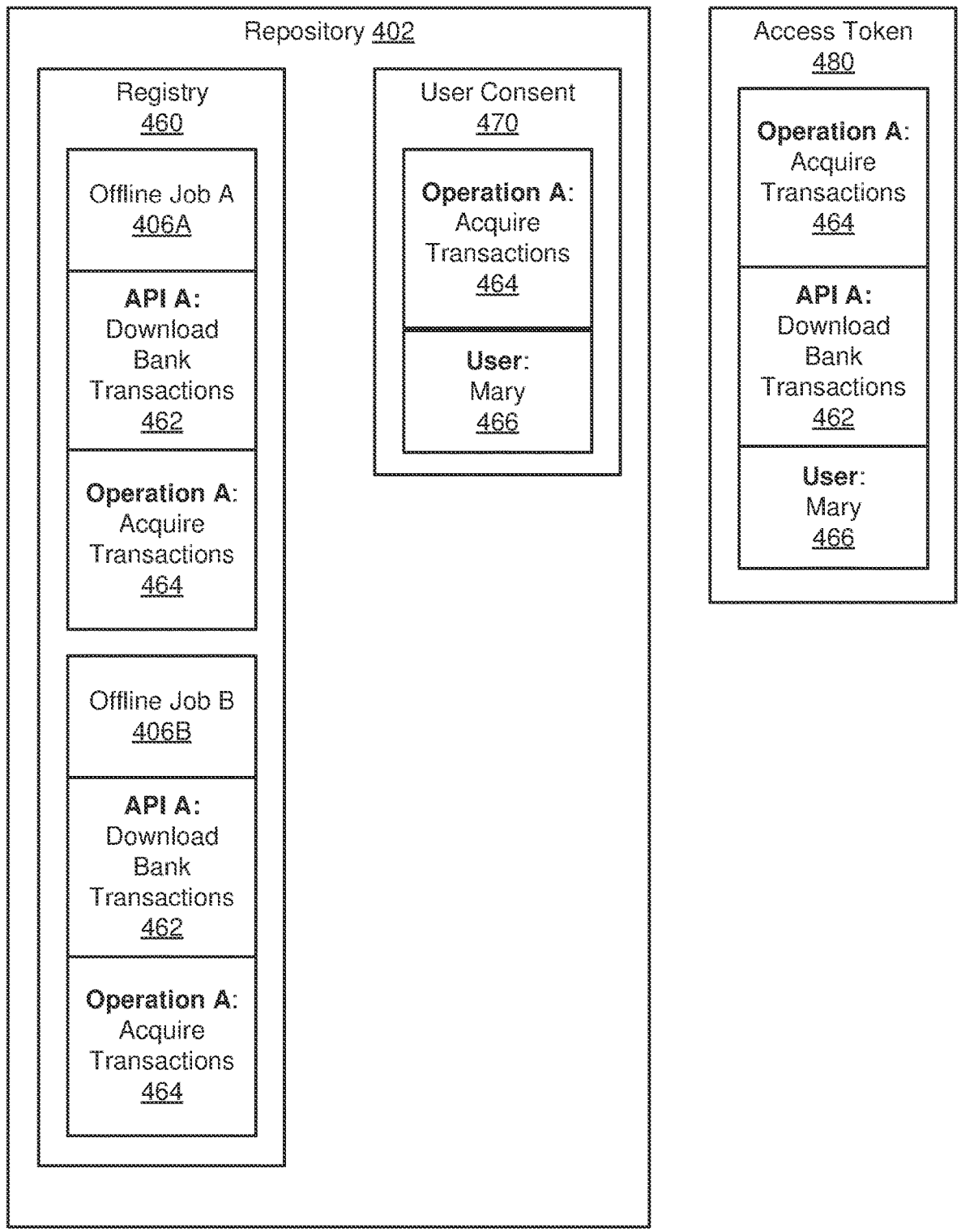

FIG. 4A and FIG. 4B show an implementation example(s) in accordance with one or more embodiments. The implementation example(s) are for explanatory purposes only and not intended to limit the scope of the invention. One skilled in the art will appreciate that implementation of embodiments of the invention may take various forms and still be within the scope of the invention.

FIG. 4A illustrates, in accordance with one or more embodiments, the relative timing of steps performed by one or more components described in reference to FIG. 1, in accordance with the flowcharts in FIG. 2 and FIG. 3. These components include: a repository (402) ((102) in FIG. 1), a runtime manager (404) ((104) in FIG. 1), offline jobs (406A, 406B) ((120A, 120N) in FIG. 1), and a financial management application (FMA) (408) ((128) in FIG. 1). Offline job A (406A) and offline job B (406B) communicate with different financial institutions, in this case, bank A and bank B, respectively.

As shown in FIG. 4A, initially, in Step 410, the FMA (408) creates offline job A (406A) and offline job B (406B) for the purpose of acquiring transactions.

In Step 412, the runtime manager (404) receives a registration request from offline job A (406A). The registration request includes an identifier of an operation to acquire transactions from financial institutions, and an identifier of an API that downloads transactions from banks (i.e., a type of financial institution).

In Step 414, the runtime manager (404) registers the API and the operation with offline job A (406A) by adding an entry to the registry of the repository (402). FIG. 4B shows that the repository (402) includes the registry (460) ((116) in FIG. 1), which in turn includes an entry that includes an identifier of offline job A (406A), the identifier of the API (462), and the identifier of the operation (464).

In Step 416, the runtime manager (404) receives a registration request from offline job B (406B). The registration request includes the identifier of the operation to acquire transactions from financial institutions, and the identifier of the API that downloads transactions from banks.

In Step 418, the runtime manager (404) registers the API and the operation with offline job B (406B) by adding an entry to the registry (460). FIG. 4B shows that the entry includes an identifier of offline job B (406B), the identifier of the API (462), and the identifier of the operation (464).

In Step 420, the FMA (408) detects an action that requires offline processing while the user is using the FMA (408). In this case, the action adds a connection to bank A.

In Step 422, the FMA (408) derives, from the action, user consent for the operation to acquire transactions of the user. By applying a rule for deriving the user consent, the FMA (408) infers that the user has given implied consent to the acquisition of transactions of the user for all banks that the user is connected to in the FMA (408). Implicitly deriving the user consent from the action streamlines the processing of user consents by eliminating an explicit interaction or interface with the user to obtain user consent for the operation. The user continues to add connections to additional banks, including bank B, while using the FMA (408).

In Step 424, the FMA (408) records the user consent in the repository (402) by adding a record to the repository (402). FIG. 4B shows that the repository (402) includes the user consent (470), which includes the identifier of the operation (464) and an identifier of the user (466).

In Step 426, the runtime manager (404) receives an access token request from offline job A (406A). The access token request includes the identifier of the user, the identifier of the operation, and the identifier of the API.

In Step 428, the runtime manager (404) obtains the user consent (470) from the repository (402). That is, upon receiving the request for the access token, the runtime manager (404) checks whether the user consent (470) to perform the operation (464) for the user (466) has been recorded in the repository (402). The runtime manager (404) caches the user consent (470) to streamline the process of obtaining the user consent (470) when the runtime manager (404) again needs to obtain the user consent (470), for example, in Step 444 below.

In Step 430, the runtime manager (404) verifies the registration of the API (462) and the operation (464) with offline job A (406A) by checking whether a record exists in the registry (460) that includes the identifier of offline job A (406A), the identifier of the API (462), and the identifier of the operation (464). In this case, such a record exists in the registry (460), as shown in FIG. 4B (see Step 414 above).

In Step 432, now that the user consent (470) has been obtained from the repository (402), and the registration of the API (462) and the operation (464) with offline job A (406A) has been verified, the runtime manager (404) creates the access token that was requested by offline job A (406A) in Step 426 above. FIG. 4B shows that the access token (480) includes the identifier of the operation (464), the identifier of the API (462), and the identifier of the user (466). The access token (480) does not include the user consent (470), since the user consent (470) is stored in the repository (402), and the repository (402) is entirely separate from the access token (480). The runtime manager (404) is responsible for obtaining the user consent (470) in Step 428 above, and the FMA (408) is responsible for deriving the user consent (470) in Step 422 above. In contrast, offline job A (406A) is entirely free from any processing overhead related to any aspect of managing the user consent (470).

In Step 434, the runtime manager (404) transmits the access token (480) to offline job A (406A). Once the access token (480) is transmitted to offline job A (406A), offline job A (406A) may simply assume that the user consent (470) has been obtained. That is, from the perspective of offline job A (406A), transmission of the access token (480) by the runtime manager (404) to offline job A (406A) is sufficient evidence of properly obtained user consent (470).

In Step 436, offline job A (406A) acquires transactions A from bank A by calling the API corresponding to the identifier of the API (462) with the access token (480).

In Step 438, offline job A (406A) transmits transactions A to the FMA (408).

In Step 440, the FMA (408) analyzes transactions A while performing cash flow and/or other financial projections for the user (466) (e.g., to determine the user's requirements for a loan).

In Step 442, the runtime manager (404) receives an access token request from offline job B (406B). The access token request includes the identifier of the user, the identifier of the operation, and the identifier of the API. Offline job A (406A) and offline job B (406B) are executing concurrently.

In Step 444, the runtime manager (404) obtains the user consent (470) from the repository (402). As an optimization, the user consent (470) may be obtained from the copy of the user consent (470) that the runtime manager (404) cached in Step 428 above, since the operation (464) and the user (466) included in the access token request received from offline job B (406B) in Step 442 above is the same as the operation (464) and the user (466) included in the access token request received from offline job A (406A) in Step 426 above. That is, the runtime manager (404) may assume (e.g., based on a policy or rule for obtaining user consent) that the user (466) has not revoked the user consent (470) between the execution of Step 426 and Step 442.

In Step 446, the runtime manager (404) verifies the registration of the API (462) and the operation (464) with offline job B (406B) by checking whether a record exists in the registry (460) that includes the identifier of offline job B (406B), the identifier of the API (462), and the identifier of the operation (464). In this case, such a record exists in the registry (460), as shown in FIG. 4B (see Step 418 above).

In Step 448, the runtime manager (404) transmits the access token (480) to offline job B (406B). That is, since the contents of the access token requests received in Step 426 and Step 442 are identical, the runtime manager (404) transmits the same access token to offline job B (406B) as was transmitted to offline job A (406A). There is no need to synchronize access to the access token (480) by offline job A (406A) and offline job B (406B), since the access token (480) is immutable (e.g., the access token (480) will not be refreshed, rotated, or modified in any way).

In Step 450, offline job B (406B) acquires transactions B from bank B by calling the API corresponding to the identifier of the API (462) with the access token (480).

In Step 452, offline job B (406B) transmits transactions B to the FMA (408). The FMA (408) then further analyzes transactions B to update (e.g., relative to the analysis performed in Step 440 above) its cash flow and/or other financial projections for the user (466).

Figure 5A:
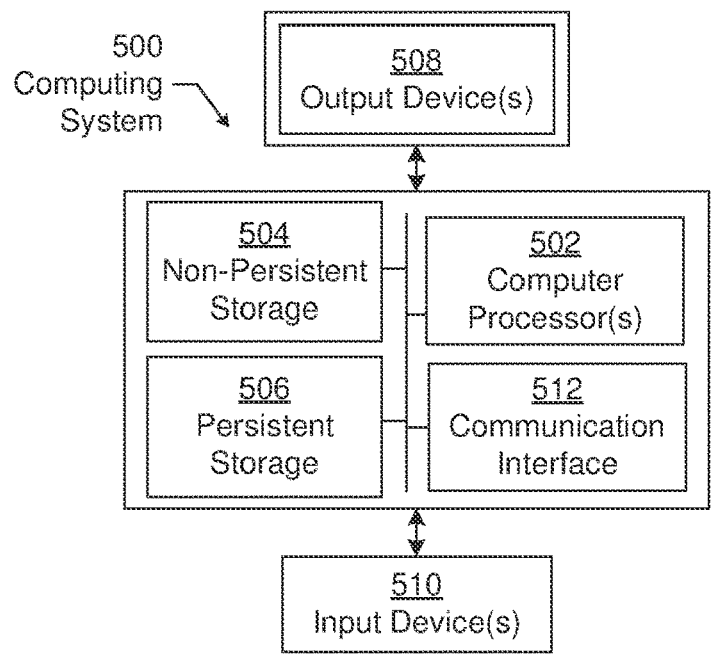
FIG. 5A and FIG. 5B show a flow diagram of computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
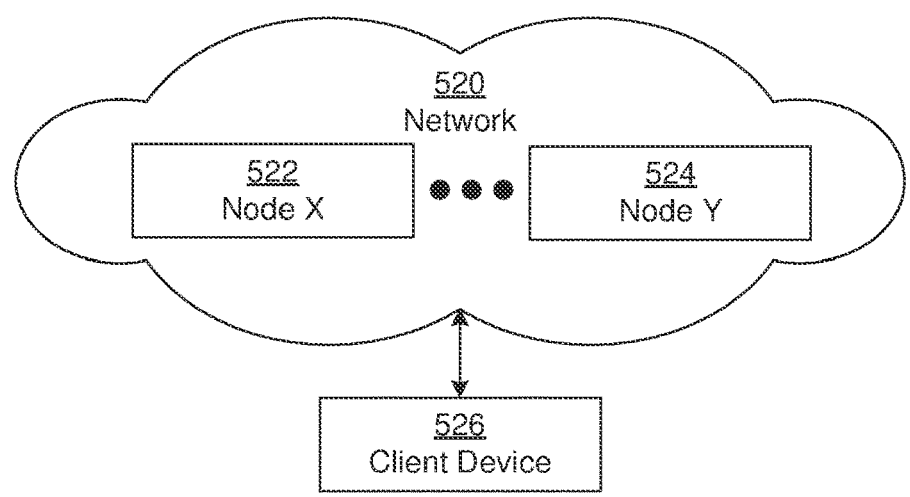

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access operation to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (e.g., database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
registering, with a first offline job to be executed by a computer processor, an application programming interface (API) and an operation;
receiving a request for an access token from the first offline job;
in response to obtaining a user consent, creating the access token specifying the operation and the API, wherein the user consent is stored external to the access token;
verifying that the first offline job is registered with the operation and the API;
transmitting the access token to the first offline job responsive to the request; and
calling, by the first offline job, the API using the access token.

2. The method of claim 1, wherein the first offline job is created by an application, the method further comprising:
detecting, while a user is using the application, an action that requires offline processing; and
deriving, from the action, the user consent.

3. The method of claim 2, further comprising:
in response to deriving the user consent, recording the user consent in a repository.

4. The method of claim 1, wherein the access token is immutable.

5. The method of claim 4, further comprising:
registering the API and the operation with a second offline job to be executed by the computer processor;
transmitting, while the first offline job is executing, the access token to the second offline job; and
calling, by the second offline job, the API using the access token.

6. The method of claim 1, further comprising:
receiving a request to register the API and the operation with the first offline job, wherein the registering is in response to receiving the request to register; and
receiving, from the first offline job, a request for the access token, wherein the user consent is obtained in response to receiving the request for the access token.

7. A system, comprising:
a memory coupled to a computer processor;
a repository configured to store:
a user consent of a user for an operation,
an application programming interface (API), and
an access token for the user specifying the operation and the API;
a first offline job, executing on the computer processor and using the memory, configured to call the API using the access token, wherein the first offline job is created by an application; and a runtime manager, executing on the computer processor and using the memory, configured to:
  register, with the first offline job, the API and the operation,
  receive a request for an access token from the first offline job;
  detect, while the user is using the application, an action that requires offline processing;
  derive, from the action, a user consent;
  in response to obtaining the user consent, create the access token, wherein the user consent is stored external to the access token, and
  transmit the access token to the first offline job responsive to the request.

8. The system of claim 7 wherein the runtime manager is further configured to:
  in response to deriving the user consent, record the user consent in the repository.

9. The system of claim 7, wherein the runtime manager is further configured to:
  prior to transmitting the access token, verify that the first offline job is registered with the operation and the API.

10. The system of claim 7, wherein the access token is immutable.

11. The system of claim 10,
  wherein the system further comprises a second offline job, executing on the computer processor and using the memory, configured to call the API using the access token, and
  wherein the runtime manager is further configured to:
    register, with the second offline job, the API and the operation, and
    transmit, while the first offline job is executing, the access token to the second offline job.

12. The system of claim 7, wherein the runtime manager is further configured to:
  receive a request to register the API and the operation with the first offline job, wherein the runtime manager registers the API and the operation with the first offline job in response to receiving the request to register, and
  receive, from the first offline job, a request for the access token, wherein the runtime manager obtains the user consent in response to receiving the request for the access token.

13. A method, comprising:
  creating, by a financial management application (FMA) executing on a computer processor, a first offline job to acquire transactions;
  receiving a request to register a first application programming interface (API) and an operation to acquire transactions with the first offline job;
  registering, with the first offline job, the first API and the operation, wherein the registering is in response to receiving the request to register;
  receiving a request for an access token from the first offline job;
  receiving, from the first offline job, a request for the access token;
  in response to obtaining a user consent, creating the access token specifying the operation and the first API, wherein the user consent is stored external to the access token, and wherein the user consent is obtained in response to receiving the request for the access token;
  transmitting the access token to the first offline job responsive to the request; and
  acquiring, by the first offline job, first transactions of a user from a first financial institution by calling the first API using the first access token.

14. The method of claim 13, further comprising:
  detecting, while the user is using the FMA, an action that adds a connection to the first financial institution; and
  deriving, from the action, the user consent.

15. The method of claim 13, further comprising:
  in response to acquiring the first transactions of the user, analyzing, by the FMA, the first transactions of the user.

16. The method of claim 15, further comprising:
  creating, by the FMA, a second offline job to acquire transactions;
  registering, with the second offline job, the first API and the operation;
  transmitting the access token to the second offline job; and
  acquiring, by the second offline job, second transactions of the user from a second financial institution by calling the first API using the first access token,
  wherein the FMA further analyzes the second transactions of the user.

17. The method of claim 16, wherein the access token is transmitted to the second offline job while the first offline job is executing.

18. The method of claim 15, further comprising:
  creating, by the FMA, a second offline job to acquire transactions;
  registering, with the second offline job, a second API and the operation;
  creating, for the user, a second access token comprising the operation and the second API;
  transmitting the second access token to the second offline job; and
  acquiring, by the second offline job, second transactions of the user from a second financial institution by calling the second API using the second access token,
  wherein the FMA further analyzes the second transactions of the user.

* * * * *